(12) United States Patent
Gold

(10) Patent No.: US 10,831,180 B2
(45) Date of Patent: Nov. 10, 2020

(54) MULTIVARIATE STATISTICAL PROCESS CONTROL OF LASER POWDER BED ADDITIVE MANUFACTURING

(71) Applicant: GENERAL ELECTRIC COMPANY, Schenectady, NY (US)

(72) Inventor: Scott Alan Gold, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 15/053,881

(22) Filed: Feb. 25, 2016

(65) Prior Publication Data

US 2017/0246810 A1     Aug. 31, 2017

(51) Int. Cl.

| | |
|---|---|
| *B29C 64/386* | (2017.01) |
| *G05B 19/4099* | (2006.01) |
| *G07C 3/14* | (2006.01) |
| *B22F 3/105* | (2006.01) |
| *B29C 64/153* | (2017.01) |
| *B33Y 50/02* | (2015.01) |
| *G06F 119/18* | (2020.01) |

(52) U.S. Cl.
CPC ........ *G05B 19/4099* (2013.01); *B22F 3/1055* (2013.01); *B29C 64/153* (2017.08); *B29C 64/386* (2017.08); *B33Y 50/02* (2014.12); *G07C 3/14* (2013.01); *B22F 2003/1057* (2013.01); *B22F 2203/03* (2013.01); *G05B 2219/35134* (2013.01); *G05B 2219/49007* (2013.01); *G06F 2119/18* (2020.01); *Y02P 10/25* (2015.11)

(58) Field of Classification Search
CPC ...... G05B 19/4099; G05B 2219/49007; G05B 2219/35134; G07C 3/14; B22F 2203/03; B22F 2003/1057; B22F 3/1055; B29C 64/386; B29C 64/153; B29C 67/0088; B33Y 50/00; B33Y 50/02; Y02P 10/295; G06F 2217/12

See application file for complete search history.

(56) References Cited

U.S. PATENT DOCUMENTS

| | | | | |
|---|---|---|---|---|
| 4,863,538 A | * | 9/1989 | Deckard | ................ B22F 3/004 |
| | | | | 156/272.8 |
| 5,304,329 A | * | 4/1994 | Dickens, Jr. | .......... B29C 64/153 |
| | | | | 264/122 |

(Continued)

FOREIGN PATENT DOCUMENTS

| | | |
|---|---|---|
| CN | 1976800 A | 6/2007 |
| JP | 2008-508129 A | 3/2008 |

(Continued)

OTHER PUBLICATIONS

Extended Chinese Search Report and Opinion issued in connection with corresponding CN Application No. 201710109352.4, CPEL1750306, dated Feb. 27, 2017.

(Continued)

*Primary Examiner* — Bitew A Dinke
(74) *Attorney, Agent, or Firm* — Dority & Manning, P.A.

(57) ABSTRACT

This invention relates to a method for using a multivariate statistical control process to reduce the variation of an additively manufactured part or object. The invention also relates to a system and software that can be used to implement the method in additive manufacturing devices or apparatuses.

16 Claims, 3 Drawing Sheets

(56) References Cited

U.S. PATENT DOCUMENTS

| | | | | |
|---|---|---|---|---|
| 5,427,733 | A * | 6/1995 | Benda | B22F 3/1055 264/40.1 |
| 5,460,758 | A * | 10/1995 | Langer | G03F 7/0037 118/429 |
| 5,609,813 | A * | 3/1997 | Allison | B29C 67/02 118/620 |
| 6,046,426 | A * | 4/2000 | Jeantette | B01F 13/0255 219/121.63 |
| 6,930,278 | B1 * | 8/2005 | Chung | B23K 26/34 219/121.83 |
| 6,995,334 | B1 * | 2/2006 | Kovacevic | B23K 26/032 219/121.63 |
| 7,757,632 | B2 | 7/2010 | Edwards et al. | |
| 8,137,739 | B2 | 3/2012 | Philippi et al. | |
| 9,662,840 | B1 * | 5/2017 | Buller | B29C 67/0088 |
| 2003/0028278 | A1 * | 2/2003 | Darrah | G05B 19/4099 700/119 |
| 2004/0191106 | A1 * | 9/2004 | O'Neill | A61F 2/30771 419/2 |
| 2004/0200816 | A1 * | 10/2004 | Chung | G05D 23/1919 219/121.83 |
| 2005/0288813 | A1 | 12/2005 | Yang et al. | |
| 2007/0160820 | A1 | 7/2007 | Waters, Jr. | |
| 2008/0015814 | A1 | 1/2008 | Harvey, Jr. et al. | |
| 2008/0109090 | A1 * | 5/2008 | Esmaili | G05B 17/02 700/29 |
| 2008/0306621 | A1 * | 12/2008 | Choi | G05B 19/41875 700/110 |
| 2009/0206065 | A1 * | 8/2009 | Kruth | B22F 3/1055 219/121.66 |
| 2011/0278277 | A1 | 11/2011 | Stork Genannt Wersborg | |
| 2012/0237745 | A1 * | 9/2012 | Dierkes | A61K 6/0215 428/215 |
| 2013/0300035 | A1 * | 11/2013 | Snis | B22F 3/1055 264/497 |
| 2014/0163717 | A1 | 6/2014 | Das et al. | |
| 2014/0332507 | A1 * | 11/2014 | Fockele | B22F 3/1055 219/121.61 |
| 2014/0358273 | A1 | 12/2014 | Labossiere et al. | |
| 2015/0048064 | A1 * | 2/2015 | Cheverton | B22F 3/1055 219/121.63 |
| 2015/0087553 | A1 * | 3/2015 | Bahado-Singh | G01N 33/6812 506/12 |
| 2015/0165693 | A1 | 6/2015 | Sagoo et al. | |
| 2015/0174822 | A1 * | 6/2015 | Huang | B29C 67/0077 264/497 |
| 2015/0177158 | A1 * | 6/2015 | Cheverton | G01N 15/0227 700/119 |
| 2015/0367447 | A1 * | 12/2015 | Buller | B23K 26/346 219/74 |
| 2016/0179064 | A1 * | 6/2016 | Arthur | G05B 15/02 700/98 |
| 2016/0279734 | A1 * | 9/2016 | Schick | B23K 26/0006 |
| 2017/0203512 | A1 * | 7/2017 | Gold | B29C 67/0077 |
| 2017/0232511 | A1 * | 8/2017 | Fieldman | B33Y 10/00 419/7 |
| 2017/0232512 | A1 * | 8/2017 | Joerger | B22F 3/1055 419/53 |
| 2017/0232670 | A1 * | 8/2017 | Joerger | B29C 67/0077 264/497 |
| 2017/0232671 | A1 * | 8/2017 | Fieldman | B29C 67/0077 264/497 |
| 2017/0232672 | A1 * | 8/2017 | Fieldman | B29C 67/0077 264/497 |
| 2017/0232682 | A1 * | 8/2017 | Alcantara Marte | B29C 67/0092 264/497 |
| 2017/0232683 | A1 * | 8/2017 | Alcantara Marte | B29C 67/0077 264/497 |
| 2017/0246682 | A1 * | 8/2017 | Duerig | B22F 3/1055 |
| 2017/0246810 | A1 * | 8/2017 | Gold | B33Y 50/02 |
| 2017/0252805 | A1 * | 9/2017 | Gillespie | B22F 3/1055 |
| 2017/0259504 | A1 * | 9/2017 | Lin | B29C 67/0077 |
| 2017/0326790 | A1 * | 11/2017 | Lee | B29C 64/165 |
| 2018/0001384 | A1 * | 1/2018 | Manteiga | B22F 3/24 |
| 2018/0029306 | A1 * | 2/2018 | Gold | B29C 67/0074 |
| 2018/0322621 | A1 * | 11/2018 | Craeghs | G01N 21/8851 |

FOREIGN PATENT DOCUMENTS

| | | | | |
|---|---|---|---|---|
| JP | | 2012509189 A | 4/2012 | |
| JP | | 2015-196164 A | 11/2015 | |
| JP | | 2015196164 A | 11/2015 | |
| WO | | 2015/040433 A2 | 3/2015 | |
| WO | | 2016/015752 A1 | 2/2016 | |
| WO | WO | 2017158327 A1 * | 9/2017 | B29C 64/153 |

OTHER PUBLICATIONS

Sood, A.K., et al., "Optimization of Process Parameters in Fused Deposition Modeling Using Weighted Principal Component Analysis," Journal of Advanced Manufacturing Systems, vol. 10, Issue 2, pp. 241-259 (Dec. 11, 2011).

Vlasea, M.L., et al., "Development of powder bed fusion additive manufacturing test bed for enhanced real time process control," Solid Freeform Fabrication Symposium, National Institute of Standards and Technology, pp. 527-539 (Aug. 27, 2015).

Extended European Search Report and Opinion issued in connection with corresponding EP Application No. 17157450.2 dated Jul. 17, 2017.

Machine Translation and Notification of Reasons for Refusal issued in connection with corresponding JP Application No. 2017-026515 on Mar. 27, 2018.

Berumen et al, "Quality control of laser- and powder bed-based Additive Manufacturing (AM) technologies", Physics Procedia 5, 2010, pp. 617-622.

Bourell et al, "Identifying the Future of Freeform processing", Roadmap for Additive Manufacturing, Austin, TX, 2009, pp. 1-102.

Chiang et al, "Fault Detection and Diagnosis in Industrial Systems", Series:Advanced Textbooks in Control and Signal Processing, London, 2001 (Abstract Only).

Craeghs et al, "Feedback control of Layerwise Laser Melting using optical sensors", Physics Prodedia 5, 2001, pp. 505-514.

Energetics Incorporated, "Workshop Summary Report", Measurement Science Roadmap for Metal-Based Additive Manufacturing, National Institute of Standards and Technology, May 2013, pp. 1-86.

Mani et al, "Measurement Science Needs for Real-time Control of Additive Manufacturing Powder Bed Fusion Processes", National Institute of Standards and Technology, Feb. 2015, pp. 1-50.

* cited by examiner

MULTIVARIATE STATISTICAL PROCESS CONTROL OF LASER POWDER BED ADDITIVE MANUFACTURING

INTRODUCTION

This invention is in the field of laser-based additive manufacturing processes for fabricating objects. In particular, the invention relates to a method for monitoring the quality of a work piece by using multivariate statistical process controls in the fabrication of objects using additive manufacturing processes.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex work pieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional laser additive manufacturing system 100. The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern or "mark" for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress relief process. Additionally, thermal, mechanical, and chemical post processing procedures can be used to finish the part 122.

Ensuring repeatability and consistency is a challenge that has not been previously addressed in laser AM because AM has been conventionally used as a means to fabricate parts for prototyping purposes. However, as AM moves from prototyping parts to mass producing parts, there is a greater need for repeatability and reproducibility from build to build and machine to machine such that the same parts may be produced on a consistent basis. This must be accomplished without sacrificing the overall quality of the parts being produced, which will require some inspection or scrutiny of the final part. To date, AM processes have had difficulty in producing quality parts on a consistent basis. This has been dubbed, on more than one occasion, as the Achilles heel of AM processes. A critical step in resolving this problem is to develop methods of monitoring and correcting for errors during the AM fabrication process, such that there is a reduced need to perform post-process quality inspections.

In any manufacturing process, variables, such as, but not limited to time, temperature, and/or speed, exist and will affect the overall quality of any particular work piece. In the case of laser AM processes, the fabrication of a part can be affected by numerous parameters requiring careful monitoring of the build process so that the manufacturing process results in a final product having limited deformities and/or requiring limited post fabrication processing. Numerous approaches to monitoring process variables in laser AM processes have been described in the prior art. For example, U.S. Pat. No. 6,995,334 relates to a method of real-time monitoring of the size of a melt pool created by a laser on a substrate, where monitoring is accomplished by an imaging device and real-time adjustments are made to the power of the laser to match those of a control. U.S. Application 20090206065 relates to a feedback method of monitoring and controlling a selective laser powder processing device by monitoring the melt zone and adjusting in real time the laser power, laser spot size, or scan velocity to maintain a constant melt zone. Finally, U.S. Pat. No. 5,427,733 relates to a method of monitoring the temperature of the metal powder upon contact by a laser, and adjusting the laser in response to the temperature read-out to provide a constant laser output power. However, most of the prior art methods are limited to one particular variable in the laser AM process (e.g., laser power or temperature). Examining a single process variable provides only limited value, especially when multiple in-process variables affect the final product. For example, in U.S. Pat. No. 5,427,733, temperature of the metal powder is the process variable monitored and adjustments to the laser power are made to maintain a constant temperature in the heat affected zone of a sintering process. To accomplish this, temperature is monitored by measuring the radiative emission along the laser beam path and correlating this to a particular temperature. The optical path, which changes as the laser scans around the build surface, introduces another variable to the system in addition to the temperature. In a melting regime (as opposed to a sintering regime), this is further complicated by the presence of a plasma plume above the melt pool, which may further influence the signal. Thus, monitoring a single variable, while useful in some respects, offers limited value when the reality of the laser based AM process involves multiple in-process variables.

Reviewing the process through which the parts are made will provide a more robust picture of the variability within the process and provide for a better means for correcting the variability of the process parameters during the manufacturing process. Ultimately, this will lead to a reduction in post manufacturing or post-process quality inspection One way of performing this function is through statistical process controls (SPC) and control charts. SPC is a means by which quality of a particular process, such as but not limited to a manufacturing process, can be monitored and controlled in a process through the use of statistical methods. Through SPC a particular signature or output of a manufacturing process is monitored to ensure that the entire process is operating in a stable, repeatable manner. Within any process, whether it is manufacturing or any other, variations inherently exist, which are acceptable so long as they meet certain stability criteria, such as falling within a statistically acceptable range. A process is generally understood to be stable and in control if, based on prior experience and observation, it can be predicted how the process will vary within certain stability criteria, for example a statistically acceptable upper limit and lower limit range. A process is viewed as being unstable if, for example, the variation during the process exceeds either of the statistically determined upper and lower limits.

One way of determining the statistically acceptable variation in a process is by using control charts (also known as Shewhart charts or process-behavior charts). Control charts plot the changes and variations of a particular process over time. The charts display a median or central line for the average of the process, an upper control limit and a lower control limit. By observing and plotting a process over time, the variations can be compared to historical data gathered from previous processes and deemed to be statistically stable or out of control, depending on whether the individual points fall within statistically acceptable ranges about the median and meet other stability criteria (e.g., following the Western Electric rules). Comparing the process variations against the average, upper limit and lower limit lines, one of skill can draw conclusions about whether the overall process variations are in control or out of control. One commonly used type of control chart is an individual and moving range (I-MR) chart (see, e.g., FIG. 2). This type of control chart is capable of monitoring continuous data, where one data point is collected at each time point. The I-MR chart consists of two charts, which together monitor the process average as well as process variation. The "I" chart monitors the trends and shifts in individual data points during the process. The "MR" chart is used to monitor short term variations in the moving range of data observed during the process.

Because laser based AM has been limited to prototyping parts, there is not yet a full appreciation of the in-process production analysis required for mass producing parts. Reducing the need to inspect each and every item produced will allow for rapid and efficient mass production of parts. Instead, monitoring in-process variables through SPC will enable statistical sampling as one way to perform quality inspection of the parts produced using laser based AM. The laser based AM process includes a variety of process variables including, but limited to, laser power or drive signal, X and Y positional location on the build plate, laser scan velocity, laser scan direction, on-axis optical signal from melt pool and/or plasma (PD or pyrometer), melt pool size, off-axis optical signal from melt pool and/or plasma, incidence of angle of laser relative to build surface, incidence of angle of laser relative to part being built, gas flow velocity, and/or conductive properties of part being built below given layer/location.

Monitoring a single variable, while useful on some level, does not take into account the multifaceted interrelationship between a plurality of the process variables that go into additively manufacturing a part. Despite recognizing and understanding that these process variables affect the final build quality, no meaningful process control system currently exists on laser additive manufacturing. To the extent that the prior art describes a process control mechanism to monitor the process, it is limited to monitoring single variable and adjusting the process in a feedback based mechanism. However, monitoring a single variable has limited value, as most often multiple factors impact, for example common sensor responses. For example, on-axis photodiode responses are a function of at least the following variables: laser power, laser scan speed, laser scan direction, powder layer thickness, laser incidence angle relative to the part being built, and gas flow velocity. For example, it is common for on-axis photodiode response to be unstable and out of statistical control in any given part of a scan strategy (e.g., hatch, post-contour, etc) despite being fully accounted for when looking at a single process variable. Thus, a discrepancy exists when examining a single variable during the fabrication process.

This invention overcomes the analysis of examining a single variable, also known as univariate SPC, by monitoring and determining build quality and variation based on multiple key processes. Moving away from univariate SPC to multivariate SPC allows for further increased efficiency and higher quality builds. A multivariate statistical process control approach takes into account the mean or the relationship between several related variables.

BRIEF DESCRIPTION OF THE INVENTION

The present invention relates to a method of controlling the quality of a laser based AM process by monitoring key process variables obtained during the AM process and statistically determining based on multivariable statistical process control (SPC) analysis whether the build process meets stability criteria, including falling within statistically acceptable ranges. If the process meets stability criteria, including falling within statistically acceptable ranges, the process is deemed to be stable, however, if it falls outside of the statistically acceptable range, it is out of control and requires stopping the process and adjusting the plurality of variables to bring the process back into statistically acceptable range. The multivariate SPC utilizes in-process monitoring of signals from a combination of on-axis electromagnetic sensors, off-axis electromagnetic sensors, acoustic sensors, laser galvanometer drive signals, laser power/drive sensors. In another embodiment, the invention also relates to a system comprising an additive manufacturing apparatus and software for performing the multivariate SPC process. The system allows the additive manufacturing apparatus to review multiple process variables and compares the variables to a statistically acceptable range of deviation from a standard and alerts and provides the operator with data that one or more process variables, if required, requires adjustment such that the process falls back within stability criteria, such as statistically normal or acceptable ranges.

DETAILED DESCRIPTION OF VARIOUS EMBODIMENTS OF THE INVENTION

Figure 1:
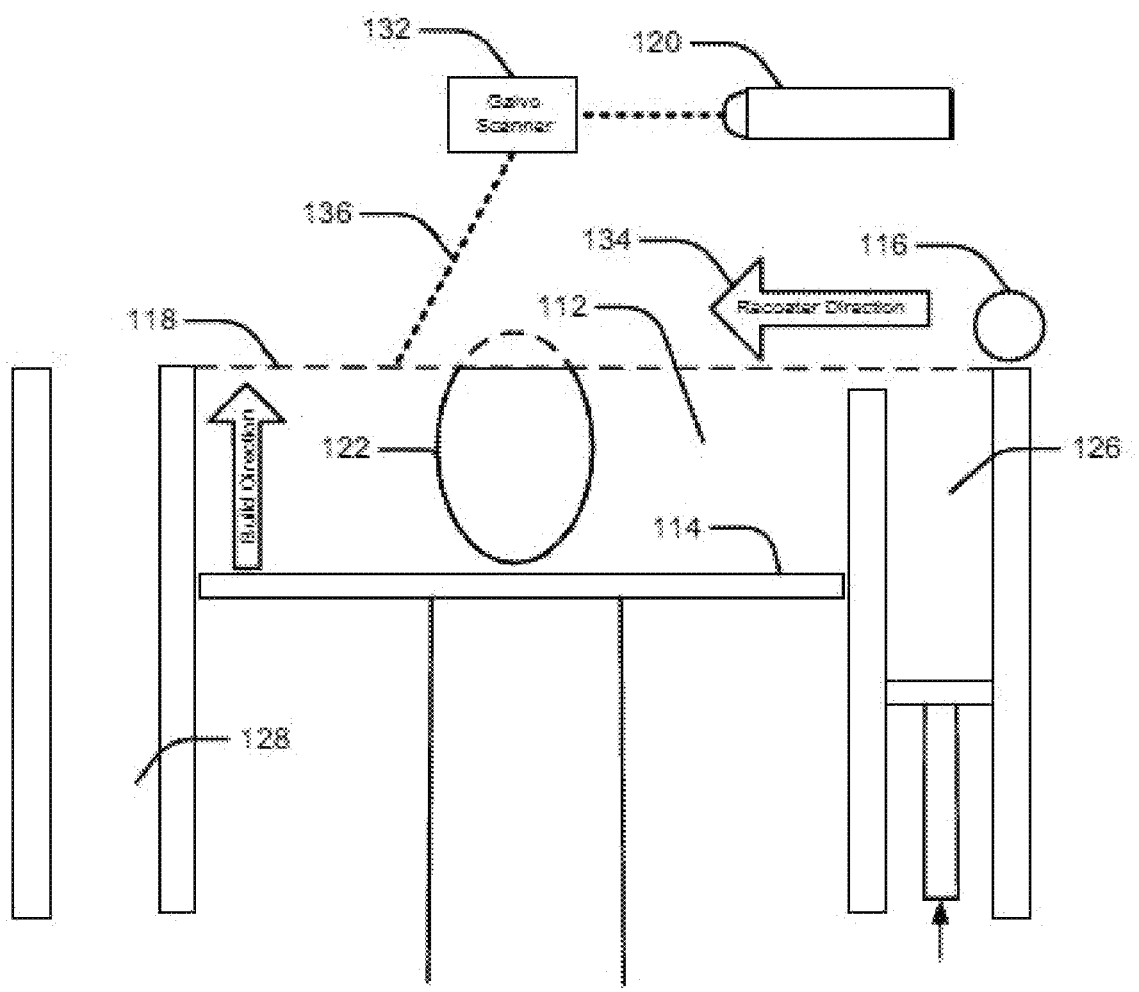
FIG. 1 is a schematic view of a conventional laser additive manufacturing apparatus. a laser additive manufacturing process diagramming the melt pool and the path and speed with which the laser moves during the manufacturing process.
Figure 2:
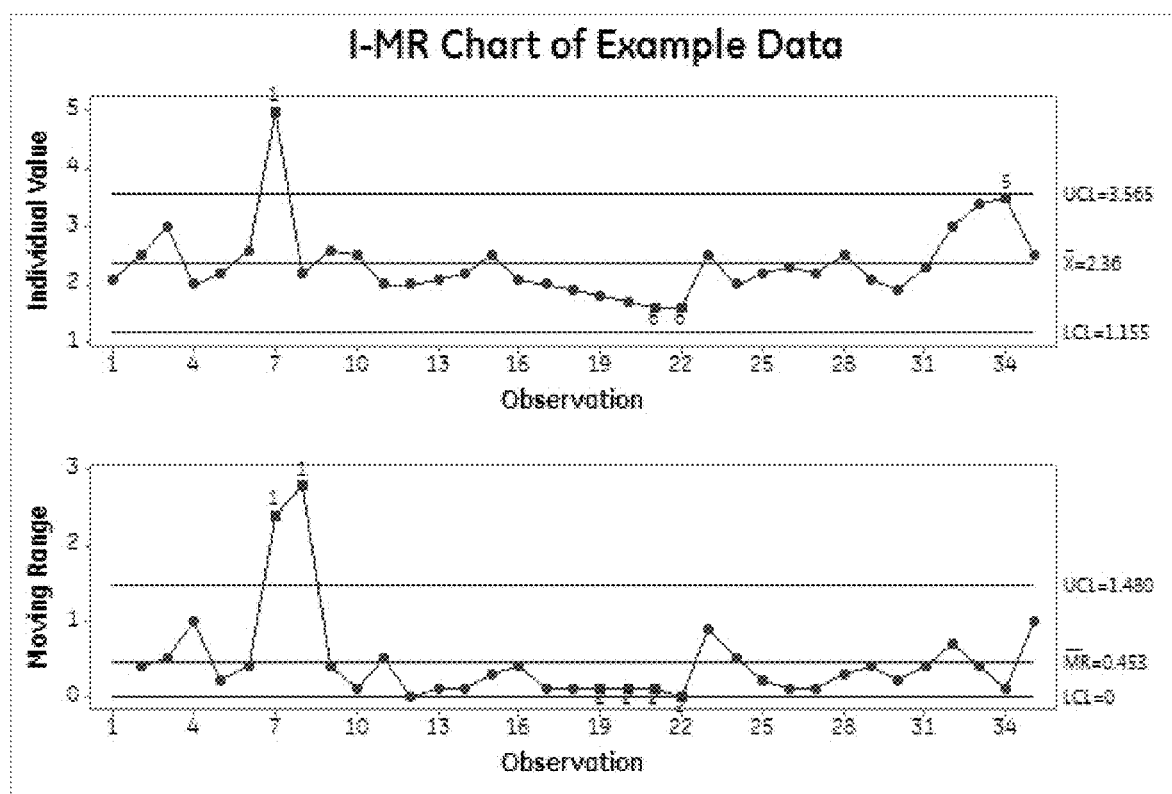
FIG. 2 is a I-MR control chart showing statistically acceptable and unacceptable ranges for monitoring a single variable.

The following detailed description sets forth a method of using a multivariate statistical process control to evaluate whether an additive manufacturing build process meets stability criteria, including falling with statistically acceptable range, for a particular build. The description should clearly enable one of skill in the art to use the method, and the description sets forth several embodiments, adaptations, variations, alternatives, and uses of the method, including what is presently believed to be the best mode thereof. While the described method is being described as being performed on one particular type of laser additive manufacturing process or using some of the possible process variables, it is contemplated that this method is broadly applicable to other additive manufacturing processes or capable of including other process variables that affect the building process.

In one embodiment, the method relates to manufacturing a part or object by laser additive manufacturing comprising the steps of: (a) irradiating a layer of powder in a powder bed to form a fused region; (b) providing a subsequent layer of powder over the powder bed by passing a recoater arm over the powder bed from a first side of the powder bed; (c) repeating steps (a) and (b) to form the part in the powder bed; (d) while conducting steps (a)-(c), recording signals of two or more process parameters the process parameters comprising laser power, laser power drive signal, x/y position of laser focus on build surface, laser scan speed, laser scan direction, on-axis electromagnetic emission from the melt pool, on-axis electromagnetic emission from the plasma, melt pool size, off-axis electromagnetic emission from melt pool, off-axis electromagnetic emission from plasma, incidence angle of laser relative to build surface, incidence angle of laser relative to the part, gas flow velocity, powder bed temperature, powder layer thickness, or the thermal conductive properties of part below a given layer/location; (e) transforming two or more recorded signals into a reduced variable signal for the recorded process parameters; (f) determining whether the reduced variable signal is within control limits for the process; and (g) generating an alert signal when the reduced variable signals exceed the control limits.

In one embodiment, the invention relates to a method of multivariate statistical process control (SPC) for a laser AM process, wherein the method comprises calculating a reduced variable set while building a work piece from process variables and returning a signal indicating whether the process remains within statistical control. The evaluation of the returned signal can then be used to either allow the process to continue in statistical control or to initiate interruption or stopping of the process to make adjustments to the one or more set points of a controlled process variable in response to the signal. The controlled process variables include any combination of the process control parameters. In one embodiment, the controlled process variables includes average laser power, spot size, scan velocity, scan spacing, scan strategy, recoater velocity, recoater pressure, recoater dosing, powder layer thickness, powder bed temperature, oxygen level, pressure, gas flow velocity, system pressure, or ambient temperature.

In another aspect, the invention relates to a method of reducing variation in laser AM build quality of an object comprising monitoring and adjusting, based on a return signal, a process variables obtained from a multivariate SPC during building the object. The adjustment of the process variables, if needed, includes manipulating one or more set points of the controlled process variables, such that the manipulations bring the unstable or out of control laser AM building process back into statistically acceptable ranges. The multivariate SPC is based on converting the process variables into a reduced set of variables such that the manufacturing process can be monitored for variance from the norm or standard. Any variance from the standard or norm will allow the operator to adjust one or more process variables or set points so that the build process meets stability criteria, including falling within statistically acceptable ranges.

In another aspect, the invention relates to a system comprising an additive manufacturing apparatus and a system that performs the multivariate SPC process. The system allows the additive manufacturing apparatus to review multiple process variables and compares the variables to a meet stability criteria, including falling within statistically acceptable range of deviation from the norm, and adjusts one or more process variables, if required, to fall within statistically normal or acceptable ranges.

In another embodiment, the invention relates to a system for reducing variability in a laser AM object comprising a laser AM component, and an analysis component that monitors, stores, and computes process variables that affect the manufacturing of the part, wherein the analysis component determines the whether the additive manufacturing component is producing the object within statistically acceptable control, where if the process falls outside of the statistically determined norm or standard, it provides the operator with a signal, where the operator is able to manipulate one or more set points gathered from the reduced variable set to make adjustments to the process to make the AM process meet stability criteria, including falling within statistically acceptable variations.

The method is applicable to any laser AM process having a variety of process variables that could affect the final build product. For example, any AM process that utilizes raster scanning or random scanning methods to manufacturing the build object where a variety of process variables may affect the final product is encompassed by the present invention. For example, the laser AM process of using a laser on powder bed manufacturing, such as but not limited to selective laser melting (SLM), direct metal laser sintering (DMLS) direct metal laser melting (DMLM), selective laser sintering (SLS), or any powder bed based laser additive manufacturing process.

The process variables may include a variety of elements that are involved in the process of additive manufacturing. The term process variables, process value, or process parameter are synonymous terms that refer to dynamic features of the process that are subject to change during the building process. These parameters may include, but not limited to laser power, laser power drive signal, x/y position of laser focus on build surface, laser scan speed, laser scan direction, on-axis electromagnetic emission from a melt pool, on-axis electromagnetic emission from plasma, melt pool size, off-axis electromagnetic emission from melt pool, off-axis electromagnetic emission from plasma, incidence angle of laser relative to build surface, incidence angle of laser relative to part being built, gas flow velocity, powder bed temperature, powder layer thickness, or thermal conductive properties of part being built below a given layer or location.

In order to perform the multivariate SPC, a combination of the parameters are condensed or transformed into a reduced variable set. While other forms of performing multivariate SPC are known in the art (e.g., partial least squares (PLS)), one common form described in the present application relates to the principle component analysis (PCA). PCA is a statistical procedure that uses an orthogonal transformation to convert a set of observations of possibly correlated variables into a set of values of linearly uncorrelated variables called principal components. The number of principal components is less than or equal to the number of original variables. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. The principal components are orthogonal because they are the eigenvectors of the covariance matrix, which is symmetric. PCA is sensitive to the relative scaling of the original variables. PCA seeks to obtain a linear relationship between the process variables or parameters found in the laser based AM process and defining a "reduced set" of variables. Once the reduced set of variables is determined, univariate statistical methods may be applied to determine stability of the process such as variation from statistically acceptable ranges. The creation of a reduced set of variables is based on the combination of the aforementioned parameters such that it can significantly describe variation in the laser based AM process. Any combination of the process parameters selected from laser power, laser power drive signal, x/y position of laser focus on build surface, laser scan speed, laser scan direction, on-axis electromagnetic emission from a melt pool, on-axis electromagnetic emission from plasma, melt pool size, off-axis electromagnetic emission from melt pool, off-axis electromagnetic emission from plasma, incidence angle of laser relative to build surface, incidence angle of laser relative to part being built, gas flow velocity, powder bed temperature, powder layer thickness, or thermal conductive properties of part being built below a given layer or location may be used in generating a reduced variable.

Figure 3:
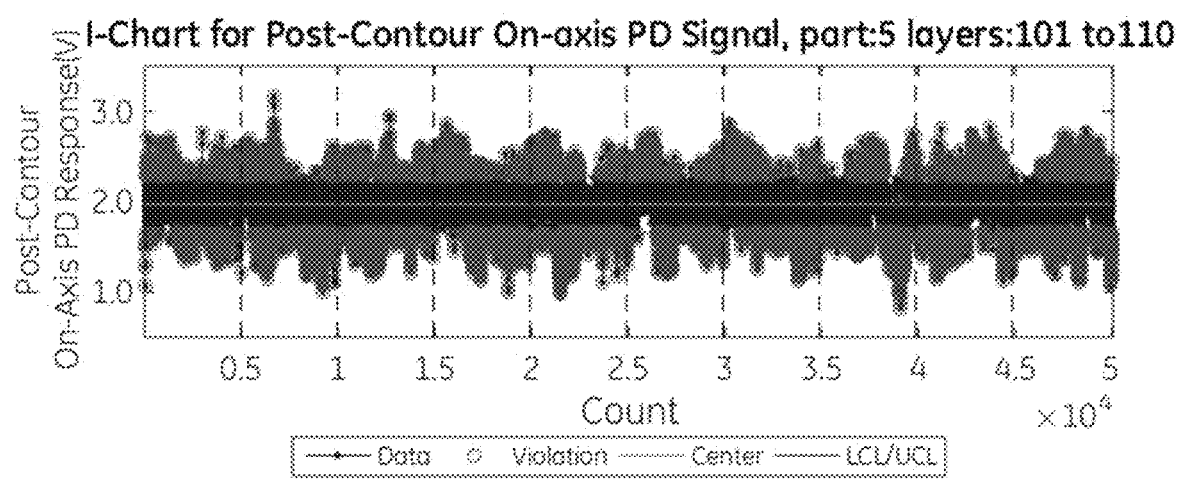
FIG. 3 is an exemplary control chart showing process parameters of a laser based AM process demonstrating the ability to monitor process variables on a layer-by-layer basis and provides whether a particular subset of layers out of all the layers are meeting stability control criteria.

The reduced variable set is critical to the build of the object. In one embodiment, the reduced set of variables is used to construct control charts that take into account a variety of process controls. The process control charts, in one embodiment is a multivariate process control chart taking into account a reduced set of variables. The reduced set of variables include any combination of one, two, three, four, five, or more of the process variables, including but not limited to laser power/drive signal, x/y position on build plate, laser scan velocity, laser scan direction, on-axis optical signal from melt pool and/or plasma (PD or pyrometer), melt pool size, off-axis optical signal from melt pool and/or plasma, incidence angle of laser relative to build surface, incidence angle of laser relative to part being built, gas flow velocity, conductive properties of part being build below a given layer/location. In another embodiment, the multivariate control charts may be used to determine whether the process of building the entire part, sections of the part, or layer(s) of the part is/are meeting stability criteria. For example, in FIG. 3, the control chart is capable of monitoring certain layers of a part to ensure that portions reflected at particular layers are falling within certain statistically acceptable ranges.

Analysis of the process control charts or multivariate control charts will allow for an analysis of whether a laser AM process is falling within statistically normal control ranges. If the process is deemed to be "out of control" the operator may intervene to halt a build or the parts may be flagged for more in depth inspection. In another embodiment, upon analysis of the multivariate control charts, deviations from the statistically acceptable control range may be adjusted by an operator who will adjust the process variables such that process variables fall within acceptable ranges. In another embodiment, if upon signaling from the system that the process is out of control or is unstable, the operator may manipulate one or more set points of the controlled process variables in response to the signal. These control process variables include average laser power, spot size, scan velocity, scan spacing, scan strategy, recoater velocity, recoater pressure, recoater dosing, powder layer thickness, powder bed temperature, oxygen level, pressure, gas flow velocity, system pressure, or ambient temperature Those of skill in the art will appreciate that a variety of methods are applicable in determining whether a reduced variable set meets stability criteria, including whether the reduced set falls within or outside of statistically acceptable ranges. In one embodiment, the determination of whether a reduced variable set meets stability criteria includes application of the Western Electric rules. For instance, in order to test for statistical significance, it is determined whether any point observed in a reduced variable set control chart falls outside of 3 standard deviations from the average or mean. This indicates that the plot of points is unnatural and the particular process step should be investigated further.

Those of skill in the art will also appreciate that computer software further automating this analysis can be programmed. In another embodiment, the above described calibration method and its software can be incorporated into laser based additive manufacturing machines. For example, the process and software for the calibration can be integrated into the standard operating procedure of a laser additive manufacturing machine.

EXAMPLE

This example relates to a laser based AM process that utilizes a multivariate statistical process control. During the manufacture of a part in a DMLM machine, a variety of parameters or process variables are monitored, including but not limited to laser power, laser power drive signal, x/y position of laser focus on build surface, laser scan speed, laser scan direction, on-axis electromagnetic emission from the melt pool, on-axis electromagnetic emission from the plasma, melt pool size, off-axis electromagnetic emission from melt pool, off-axis electromagnetic emission from plasma, incidence angle of laser relative to build surface, incidence angle of laser relative to part being built, gas flow velocity, powder bed temperature, powder layer thickness, and the thermal conductive properties of part being built below a given layer/location.

The parameters for each of the monitored and recorded process variables are calculated through PCA to a reduced variable set from the process variables. The reduced variable set is utilized to monitor the manufacturing of a part by analyzing whether the in-process reduced variable sets fall within the control limits for the process. Processes falling within statistically normal ranges are allowed to continue the laser AM process. Those processes falling outside of the statistically normal ranges are flagged and the operator will determine if the process requires stopping or whether the deviation from the statistically acceptable range will result in parts not meeting acceptable quality control parameters.

Exemplary embodiments of the method and system are described above in detail. The methods are not limited to the specific embodiments described herein. For example, the methods described herein may have other industrial and/or consumer applications and are not limited to practice with laser additive manufacturing processes or to the specifically enumerated process variables outlined. Rather, the method can be applied to other any additive manufacturing processes where a variety of process variables are involved and the combination of the variables would be critical to the build quality of the final product.

While various embodiments of the invention have been described in terms of various specific embodiments, those skilled in the art will appreciate and recognize that the invention can be practiced with modifications within the spirit and scope of the claims.

The invention claimed is:

1. A method of manufacturing a part by laser additive manufacturing comprising:
   (a) irradiating a layer of powder in a powder bed to form a fused region;
   (b) providing a subsequent layer of powder over the powder bed by passing a recoater arm over the powder bed from a first side of the powder bed;
   (c) repeating steps (a) and (b) to form the part in the powder bed;
   (d) while conducting steps (a) (c), recording, using one or more processors, signals of two or more process parameters the process parameters comprising laser power, laser power drive signal, x/y position of laser focus on build surface, laser scan speed, laser scan direction, on-axis electromagnetic emission from the melt pool, on-axis electromagnetic emission from the plasma, off-axis electromagnetic emission from melt pool, off-axis electromagnetic emission from plasma, incidence angle of laser relative to build surface, incidence angle of laser relative to workpiece, gas flow velocity, powder bed temperature, powder layer thickness, or the thermal conductive properties of workpiece below a given layer/location;
   (e) performing principal component analysis to transform the two or more recorded signals into a reduced variable signal for the recorded process parameters, the reduced variable signal comprising one or more principal component variables, there being fewer principal component variables than the two or more recorded signals;
   (f) determining, by one or more processors, whether the reduced variable signal is within control limits for the process; and
   (g) interrupting or stopping the process, using one or more processors, when the reduced variable signal exceeds the control limits.

2. The method of claim 1, wherein the additive manufacturing process is a DMLS.

3. The method of claim 1, wherein the reduced variable signal is transformed by principle component analysis.

4. The method of claim 1, wherein the reduced variable signal is determined to be within control limits according to Western Electric rules.

5. The method of claim 1, wherein the reduced variable signal is determined to be within control limits based on at least one multivariate control chart.

6. The method of claim 5, wherein the at least one multivariate control chart is a combination of at least two process variables.

7. The method of claim 6, wherein the at least one multivariate control chart is a combination of more than two process variables.

8. The method of claim 5, wherein step (d) is performed for one group of layers that are a subset of the total number of layers in the part.

9. A method of multivariate statistical process control for a laser powder bed additive manufacturing process, comprising
   recording signals of a plurality of process parameters;
   building a solid three-dimensional object from the recorded process parameters;
   calculating, using a multivariate statistical process control method, a reduced variable set while building the three-dimensional object from the recorded process parameters, wherein the reduced variable set comprises one or more principal component variables, there being fewer principal component variables than the plurality of process parameters;
   returning a signal indicating whether the laser powder bed additive manufacturing process remains within statistical control based at least in part on the reduced variable set; and
   interrupting or stopping the laser powder bed additive manufacturing process if the signal indicated that the laser powder bed additive manufacturing process does not remain within statistical control.

10. The method of claim 9, wherein the plurality of process parameters include average laser power, spot size, scan velocity, scan spacing, scan strategy, recoater velocity, recoater pressure, recoater dosing, powder layer thickness, powder bed temperature, oxygen level, pressure, gas flow velocity, system pressure, or ambient temperature.

11. A non-transitory computer-readable medium containing computer executable instructions to implement the method of multivariate statistical process control according to claim 1.

12. The non-transitory computer-readable medium of claim 11, further comprising being integrated into direct metal laser melting (DMLM) machine.

13. The method of claim 1, further comprising the step of: flagging parts manufactured when the reduced variable signal exceeds the control limits.

14. The method of claim 9, further comprising:
flagging parts manufactured when the reduced variable set is not within statistical control.

15. The method of claim 1, wherein the reduced variable signal is calculated by transforming the two or more recorded signals using a multivariate statistical process control method.

16. A method of manufacturing a part by laser additive manufacturing comprising:
(a) irradiating a layer of powder in a powder bed to form a fused region;
(b) providing a subsequent layer of powder over the powder bed by passing a recoater arm over the powder bed from a first side of the powder bed;
(c) repeating steps (a) and (b) to form the part in the powder bed;
(d) while conducting steps (a) (c), recording, using one or more processors, signals of two or more process parameters the process parameters comprising laser power, laser power drive signal, x/y position of laser focus on build surface, laser scan speed, laser scan direction, on-axis electromagnetic emission from the melt pool, on-axis electromagnetic emission from the plasma, off-axis electromagnetic emission from melt pool, off-axis electromagnetic emission from plasma, incidence angle of laser relative to build surface, incidence angle of laser relative to workpiece, gas flow velocity, powder bed temperature, powder layer thickness, or the thermal conductive properties of workpiece below a given layer/location;
(e) performing an orthogonal transformation to transform the two or more recorded signals into a reduced variable signal for the recorded process parameters, the reduced variable signal comprising one or more principal component variables, there being fewer principal component variables than the two or more recorded signals;
(f) determining, by one or more processors, whether the reduced variable signal is within control limits for the process; and
(g) interrupting or stopping the process, using one or more processors, when the reduced variable signal exceeds the control limits.

* * * * *